United States Patent
Wang et al.

(10) Patent No.: US 10,355,457 B2
(45) Date of Patent: Jul. 16, 2019

(54) ARC COMPRESSION-BASED ARC-EXTINGUISHING LIGHTNING-PROTECTION GAP DEVICE

(71) Applicants: Yanlei Wang, Guangxi (CN); Jufeng Wang, Guangxi (CN)

(72) Inventors: Yanlei Wang, Guangxi (CN); Jufeng Wang, Guangxi (CN)

(73) Assignee: Nanning Supervolt Electric Technology Co., Ltd. (CN)

( * ) Notice: Subject to any disclaimer, the term of this patent is extended or adjusted under 35 U.S.C. 154(b) by 0 days.

(21) Appl. No.: 16/095,462

(22) PCT Filed: May 26, 2017

(86) PCT No.: PCT/CN2017/000370
§ 371 (c)(1),
(2) Date: Oct. 22, 2018

(87) PCT Pub. No.: WO2018/040451
PCT Pub. Date: Mar. 8, 2018

(65) Prior Publication Data
US 2019/0097398 A1    Mar. 28, 2019

(30) Foreign Application Priority Data

Aug. 30, 2016  (CN) .......................... 2016 1 0760832

(51) Int. Cl.
*H01T 1/02* (2006.01)
*H01T 1/24* (2006.01)
*H01T 4/10* (2006.01)

(52) U.S. Cl.
CPC ................. *H01T 1/02* (2013.01); *H01T 1/24* (2013.01); *H01T 4/10* (2013.01)

(58) Field of Classification Search
CPC ................ H01T 1/02; H01T 1/24; H01T 4/10
See application file for complete search history.

(56) References Cited

U.S. PATENT DOCUMENTS

| 7,199,686 B1 * | 4/2007 | Tsai | ........................ | H01H 33/75 |
| | | | | 335/37 |
| 7,816,618 B2 * | 10/2010 | Uchii | ...................... | H01H 33/56 |
| | | | | 218/43 |

(Continued)

FOREIGN PATENT DOCUMENTS

| CN | 204216402 U | 3/2015 |
| CN | 104701743 A | 6/2015 |

(Continued)

OTHER PUBLICATIONS

International Search Report for PCT/CN2017/000370, dated Jul. 27, 2017.

*Primary Examiner* — Anne M Hines
(74) *Attorney, Agent, or Firm* — Brinks Gilson & Lione; Ryan L. Marshall

(57) ABSTRACT

Provided in the present disclosure is an arc compression-based arc-extinguishing lightning-protection gap device. The device comprises a lightning protector main body and an arc-striking electrode. The arc-striking electrode is fixedly mounted at one end of the main body. The other end of the main body is fixedly mounted, by means of a link fitting, to a crossarm or one end of an insulator string. The lightning protector main body is provided with an arc-extinguishing path consisting of several arc-extinguishing channels in a repeated Z-shaped arrangement. An arc-extinguishing tube at an inlet of a first arc-extinguishing channel of the arc-extinguishing path is connected to the arc-striking electrode via an arc-guiding rod, and an arc-extinguishing tube at an outlet of a last arc-extinguishing channel is connected to the link fitting. A three-way tube is provided at a joint of two adjacent arc-extinguishing channels; two ends of the three-way tube are each provided with one arc-guiding electrode; and the arc-guiding electrode has one end extending into the three-way tube and the other end con- (Continued)

nected to a nearby arc-extinguishing tube via direct contact or a wire. The present disclosure has the advantages of simple structure, reasonable design, improved arc-extinguishing performance, and stable operation.

10 Claims, 1 Drawing Sheet

(56) References Cited

U.S. PATENT DOCUMENTS

| | | | | |
|---|---|---|---|---|
| 8,013,263 | B2* | 9/2011 | Lindsey | H01H 9/0044 |
| | | | | 200/11 TC |
| 9,530,592 | B1* | 12/2016 | Blankemeyer | H01H 33/08 |
| 9,831,032 | B2* | 11/2017 | Knab | H01H 1/385 |

FOREIGN PATENT DOCUMENTS

| | | |
|---|---|---|
| CN | 106451078 A | 2/2017 |
| CN | 206041201 U | 3/2017 |

* cited by examiner

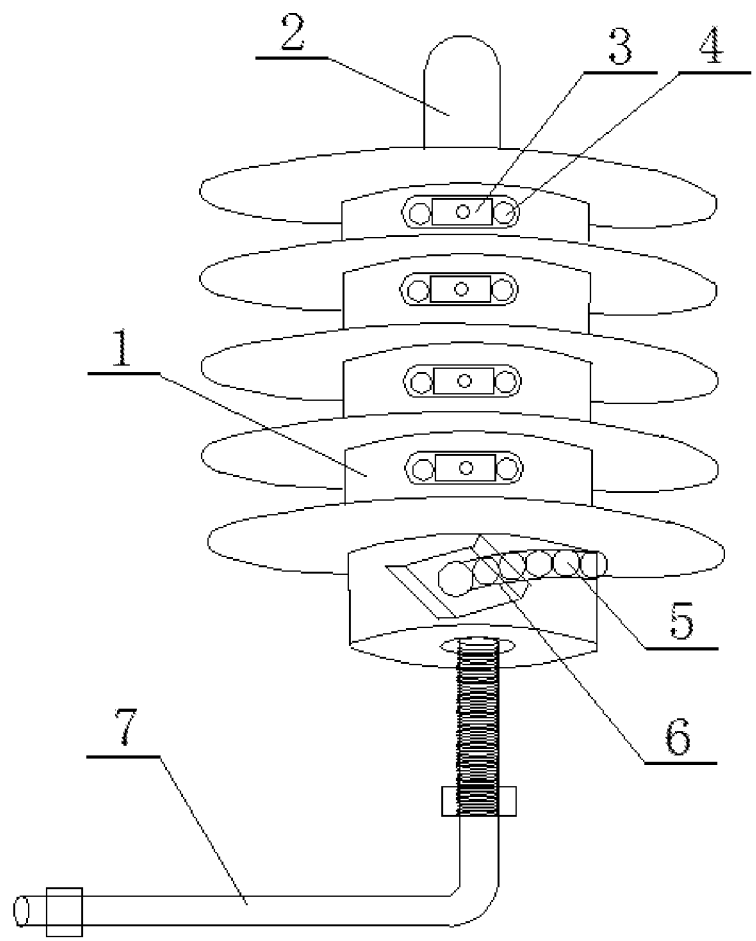

ARC COMPRESSION-BASED ARC-EXTINGUISHING LIGHTNING-PROTECTION GAP DEVICE

CROSS REFERENCE TO RELATED APPLICATIONS

This application is a 371 national phase of PCT/CN2017/000370, filed May 26, 2017, which claims the benefit of the filing date of Chinese Application No. 201610760832.2, filed Aug. 30, 2016, the disclosures of which are incorporated, in their entirety, by this reference.

FIELD OF TECHNOLOGY

The present disclosure relates to a lightning-protection device for transmission lines, and particularly to an arc compression-based arc-extinguishing lightning-protection gap device.

BACKGROUND

Lightning is an important factor that affects the safety of transmission lines and has been the primary reason causing tripping in the line fault for a long time, and it is a natural process of atmospheric activity and has been uncontrollable so far. However, the precautions against lightning can be strengthened by finding the law of lightning strikes through analyzing the frequent accidents. For example, poles and towers in the mountains or peaks, transmission lines near ponds or reservoirs, poles and towers spanning mountains or rivers and lakes, poles and towers and rocky tower footings as well as transmission lines installed with high grounding resistance are the main objects vulnerable to lightning strikes.

Lightning strikes will bring different forms of damage and destruction to the power facilities. Thundercloud discharges will cause lightning overvoltage in the power system. The overvoltage common in overhead lines comprises overvoltage in the transmission lines caused by the lightning strikes near the overhead lines through electromagnetic induction, and overvoltage generated by the direct striking of the lightning on the wires. The overvoltage due to the lightning strikes may cause damage to insulators and transmission lines. The flashover strike of the insulator due to the lightning strikes causes the burnout on porcelain surfaces or the mesh cracks on glass insulators, resulting in a significant reduction of the insulation strength. Lightning strikes on the transmission wires or the lightning conductor may cause broken stand or even breakage, resulting in a failure of the power transmission.

The lightning protection of transmission lines has always been an important part of lightning protection work for the power sector. The lightning disturbance is still one of the important factors affecting the safety of power grids. The impulse flashover, caused by the lightning strikes on the transmission lines, causes the flashover of the insulators in the lines, which then causes a large power-flow current, damages the insulator string and the fitting, resulting in line accidents. In order to protect the transmission lines, the power sector generally installs lightning protectors on the transmission lines.

Arc is free gas with high temperature and high conductivity. Extinguishing the arc is referred to as arc-extinguishing. There are many ways to extinguish arc, most of which use a certain gas or liquid to undertake the main arc-extinguishing work.

The lightning protector is an electrical device capable of releasing lightning or releasing the operation overvoltage energy of the power system to protect the electrical equipment from the damage of transient overvoltage as well as cutting off the freewheeling to avoid the grounded short circuit of the system.

For example, Chinese patent 2015100691235 discloses a countable arc-intercepting lightning protector, including a lightning protector main body and an arc-striking electrode; the arc-striking electrode is fixedly mounted at one end of the main body, the other end of the main body is fixedly mounted, by means of a link fitting, to a crossarm; the main body is provided with an arc-extinguishing path consisting of several arc-extinguishing channels in a repeated Z-shaped arrangement; a copper block is provided at a joint of two adjacent arc-extinguishing channels, and each arc-extinguishing channel is provided with two arc-extinguishing tubes, an arc-guiding ball is provided between the two arc-extinguishing tubes; the arc-extinguishing tube at an inlet of a first arc-extinguishing channel of the arc-extinguishing path is connected to the arc-striking electrode via a threaded arc-guiding rod, the arc-extinguishing tube at an outlet of a last arc-extinguishing channel is connected to a link fitting via a wire; and a counter is provided at the outlet of the last arc-extinguishing channel. The lightning protector extinguishes the arc by using an axial-blast arc-extinguishing method.

Although the patent above has played a very good role in lightning protection, there are still some shortcomings: only a radial blowing arc-extinguishing method is used, the arc is not easy to blow out when it is strong.

SUMMARY

In view of the deficiencies of the prior art, the present disclosure aims to provide an arc compression-based arc-extinguishing lightning-protection gap device having the advantages of simple structure, reasonable design, improved arc-extinguishing performance, and stable operation. In the arc compression-based arc-extinguishing lightning-protection gap device, not only the axial-blast arc-extinguishing method but also a cross-blast arc-extinguishing method can be used, and both the arc inflection point and break point are increased and more effective arc extinguishing can be achieved.

In order to achieve the object above, the present disclosure adopts the following technical solutions:

In one of the embodiments, an arc compression-based arc-extinguishing lightning-protection gap device includes a lightning protector main body and an arc-striking electrode, wherein the arc-striking electrode is fixedly mounted at one end of the main body, the other end of the main body is fixedly mounted, by means of a link fitting, to a crossarm or one end of an insulator string; the main body is provided with an arc-extinguishing path consisting of several arc-extinguishing channels in a repeated Z-shaped arrangement, and each arc-extinguishing channel is provided with two arc-extinguishing tubes between which an arc-guiding ball is provided; the arc-extinguishing tube at an inlet of a first arc-extinguishing channel of the arc-extinguishing path is connected to the arc-striking electrode via an arc-guiding rod, and the arc-extinguishing tube at an outlet of a last arc-extinguishing channel is connected to the link fitting; wherein a three-way tube is provided at a joint of two adjacent arc-extinguishing channels; two ends of the three-way tube are each provided with one arc-guiding electrode; and the arc-guiding electrode has one end extending into the three-way tube and the other end connected to a nearby arc-extinguishing tube via direct contact or a wire.

According to the lightning-protection gap device of the present disclosure, by adding the three-way tube and combining the Z-shaped arc-extinguishing path, the arc-extinguishing path is extended, the arc is stretched and thinned, and a plurality of outlet break points are formed, which realizes the mutual cooperation of the axial-blast and cross-blast arc extinguishing methods, so that the arc is easier to be extinguished and will not be reignited.

In the further illustration of the present disclosure, the arc-guiding electrode in the three-way tube has a cylindrical shape, and the arc-guiding electrode adjacent to the port of the arc-extinguishing tube has an annular shape.

In the further illustration of the present disclosure, a pair of the arc-guiding electrodes in the three-way tube is spaced apart by an air gap of 2-3 mm, and the length of the air gap is exactly the diameter of the radial tube of the three-way tube.

In the further illustration of the present disclosure, a counter is provided at the outlet of the last arc-extinguishing channel; the counter includes a ball storage device and counting balls placed within the ball storage device; an outlet of the ball storage device corresponds to the outlet of the last arc-extinguishing channel. When the lightning-protection gap device is operating, strong airflow is still blown out of the outlet of the last arc-extinguishing channel, so that the counting balls at the outlet of the ball storage device can be blown out.

In the further illustration of the present disclosure, a baffle is provided at the outlet of the ball storage device described above. The baffle can prevent the counting balls from falling off automatically when the lightning-protection gap device is not operating.

In the further illustration of the present disclosure, the counting balls described above are marked with different colors or numbers.

In the further illustration of the present disclosure, the counter described above is a spiral or vertical or resilient counter.

In the further illustration of the present disclosure, the ball storage device of the spiral counter described above is spirally mounted on the lightning protector main body.

In the further illustration of the present disclosure, the resilient counter described above is mounted at the bottom of the lightning protector main body by a fixed outer ring, and a spring is provided inside the ball storage device. The counting balls can be placed perpendicular to the fixed outer ring or parallel to the fixed outer ring. Once the device acts, one ball at the outlet is blown out, and the pressed spring pushes the counting ball next to the outlet to the outlet, so that the counting ball is in the position and waits for the next action.

In the further illustration of the present disclosure, a nut I is provided within the bottom of the lightning protector main body described above; an external thread is formed in the outer surface of the link fitting, and is in threaded connection with the nut I within the lightning protector main body by pressing an external nut tightly against a fixed plate. By arranging the fixed plate between the nuts, it can be ensured that the travelling path of the arc is the outer surface of the nut instead of the internal thread when the lightning protector is operating, so as to prevent the lightning protector from falling off due to the damage to the internal thread. By adopting the threaded connection, a stable connection of the lightning protector is ensured, so that it will not rotates or misplaced even when it is under severe natural disasters such as typhoon.

In the further illustration of the present disclosure, the lightning protector main body described above is made of hydrophobic material, and an outer surface of the lightning protector main body is provided with an umbrella skirt. At the same time, the outer shape of the lightning protector main body can be made into an insulator shape. Since the lightning protector main body is made of hydrophobic material, the inlet and outlet of each channel in the lightning protector can operate reliably even when medium such as water has entered.

In the further illustration of the present disclosure, the above described arc-striking electrode is a graphite electrode; the arc-guiding electrode is a copper electrode; and the arc-extinguishing tube is a thin ceramic tube.

The Working Process (Working Principle) of the Present Disclosure:

When a lightning strike occurs on the transmission lines, the arc-intercepting lightning protector of the present disclosure introduces the arc into the Z-shaped arc-extinguishing path in the lightning protector main body through the arc-striking electrode (due to the arc striking effect between the arc-guiding electrode of the three-way tube and the arc-guiding ball in the arc-extinguishing channel, the path of the arc is defined such that flashover cannot occur from the surface of lightning protector main body); when the arc passes through each arc-extinguishing channel in the arc-extinguishing path, the arc-extinguishing tube in the arc-extinguishing channel generates strong airflow due to high temperature, the strong airflow blows and pulls the inflection point of the arc, and the arc is re-stretched to thinned, so that the arc is more easily to be blown out and will not be reignited. Because the counter is provided at the outlet of the arc-extinguishing path, and the counting balls are blown to fall by the strong airflow, thereby realizing the counting of the number of actions. That is, the arc-intercepting lightning protector of the present disclosure is triggered by lightning pulse, and preferentially attracts, controls and changes the evolution track of the lightning impact arc, so that the impact arc generates extremely high axial pressure gradients in the arc-extinguishing tube after being strongly compressed and bent by the arc-extinguishing tube. The extremely high axial pressure gradients eject the arc from the inside of the arc-extinguishing tube to the outside, so that the arc breaks at a plurality of points, forming the large-scale segmented arc in the overall arc-extinguishing structure, thereby reducing the energy of the arc and extinguishing the arc.

Advantages of the Present Disclosure:

1. Simple structure, reasonable design, better arc-extinguishing performance, and more stable operation. Since the three-way tube is provided at the joint of the arc-extinguishing channel in combination with the Z-shaped arc-extinguishing path, the path of the arc is effectively defined, and it ensures that the arc is stretched and expanded. The arc forms a plurality of break points by the cooperation of axial-blast and cross-blast arc-extinguishing methods, and the arc is extinguished immediately and a strong ability of suppressing the re-ignition of the arc is achieved by adding the cross-blast arc-extinguishing method in the three-way tube at the inflection points of the arc (the most vulnerable part of the arc).

2. Countable capability and convenience in maintenance and replacement at later stage. Since the counter is provided at the outlet of the arc-extinguishing path, the maintainer can quickly and visually know the number of the actions, the current number of the action, and the number of the remaining actions, etc. by blowing off one counting ball at one action, so that the lightning protector can be replaced and maintained in time, thereby ensuring the operation continuity of the lightning protector.

3. Safe and reliable. The lightning-protection gap device of the present disclosure is fixed to the crossarm through the link fitting, while the link fitting and the lightning protector main body are in a threaded connection with the nut I within the lightning protector main body by pressing tightly an external nut against the fixed plate. By adopting the threaded connection, it can ensure that the walking path of the arc is the outer surface of the nut instead of the internal thread when the lightning protector is operating, thereby prevent the lightning protector from falling off due to the damage to the internal thread. By adopting the threaded connection, a stable connection of the lightning protector is ensured, so that the lightning protector will not rotate or misplace even when it is under severe natural disasters such as typhoon.

BRIEF DESCRIPTION OF THE DRAWINGS

FIG. 1 is a structural diagram of an embodiment of the present disclosure.
Wherein:
1—lightning protector main body, 2—arc-striking electrode, 3—three-way tube, 4—arc-extinguishing path, 5—counting balls, 6—ball storage device, 7—link fitting.

DETAILED DESCRIPTION

The present disclosure will be further described hereinafter with reference to the drawings and embodiments.

Embodiment 1

As shown in FIG. 1, an arc compression-based arc-extinguishing lightning-protection gap device includes a lightning protector main body 1 and an arc-striking electrode 2. The arc-striking electrode 2 is fixedly mounted at one end of the main body 1, the other end of the main body 1 is fixedly mounted, by means of a link fitting 7, to a crossarm or one end of an insulator string; the main body 1 is provided with an arc-extinguishing path 4 consisting of several arc-extinguishing channels in a repeated Z-shaped arrangement, and each arc-extinguishing channel is provided with two arc-extinguishing tubes between which a arc-guiding ball is provided; the arc-extinguishing tube at an inlet of a first arc-extinguishing channel of the arc-extinguishing path 4 is connected to the arc-striking electrode 2 via an arc-guiding rod, and the arc-extinguishing tube at an outlet of a last arc-extinguishing channel is connected to the link fitting 7. A three-way tube 3 is provided at a joint of two adjacent arc-extinguishing channels; two ends of the three-way tube 3 are each provided with one arc-guiding electrode; and the arc-guiding electrode has one end extending into the three-way tube 3 and the other end connected to a nearby arc-extinguishing tube via direct contact. The arc-guiding electrode in the three-way tube 3 has a cylindrical shape, and the arc-guiding electrode adjacent to the port of the arc-extinguishing tube has an annular shape. A pair of the arc-guiding electrodes in the three-way tube 3 is spaced apart by an air gap of about 3 mm, and the length of the air gap is exactly the diameter of the radial tube of the three-way tube 3.

A counter is provided at the outlet of the last arc-extinguishing channel. The counter includes a ball storage device 6 and counting balls 5 placed within the ball storage device 6; an outlet of the ball storage device 6 corresponds to the outlet of the last arc-extinguishing channel. A baffle is provided at the outlet of the ball storage device 6. The counting balls 5 are marked with different colors. The counter is a spiral counter. The ball storage device 6 of the spiral counter is spirally mounted on the lightning protector main body 1.

The lightning protector main body 1 is made of hydrophobic material, and an outer surface of the lightning protector main body 1 is provided with an umbrella skirt. The arc-striking electrode 2 is a graphite electrode; the arc-guiding electrode is a copper electrode; and the arc-extinguishing tube is a thin ceramic tube.

Embodiment 2

An arc compression-based arc-extinguishing lightning-protection gap device includes a lightning protector main body 1 and an arc-striking electrode 2. The arc-striking electrode 2 is fixedly mounted at one end of the main body 1, the other end of the main body 1 is fixedly mounted, by means of a link fitting 7, to a crossarm or one end of an insulator string; the main body 1 is provided with an arc-extinguishing path 4 consisting of several arc-extinguishing channels in a repeated Z-shaped arrangement, and each arc-extinguishing channel is provided with two arc-extinguishing tubes between which a arc-guiding ball is provided; the arc-extinguishing tube at an inlet of a first arc-extinguishing channel of the arc-extinguishing path 4 is connected to the arc-striking electrode 2 via an arc-guiding rod, and the arc-extinguishing tube at an outlet of a last arc-extinguishing channel is connected to the link fitting 7. A three-way tube 3 is provided at a joint of two adjacent arc-extinguishing channels; two ends of the three-way tube 3 are each provided with one arc-guiding electrode; and the arc-guiding electrode has one end extending into the three-way tube 3 and the other end connected to a nearby arc-extinguishing tube via direct contact. The arc-guiding electrode in the three-way tube 3 has a cylindrical shape, and the arc-guiding electrode adjacent to the port of the arc-extinguishing tube has an annular shape. A pair of the arc-guiding electrodes in the three-way tube 3 is spaced apart by an air gap of about 2 mm, and the length of the air gap is exactly the diameter of the radial tube of the three-way tube 3.

A counter is provided at the outlet of the last arc-extinguishing channel. The counter includes a ball storage device 6 and counting balls 5 placed within the ball storage device 6; an outlet of the ball storage device 6 corresponds to the outlet of the last arc-extinguishing channel. A baffle is provided at the outlet of the ball storage device 6. The counting balls 5 are marked with numbers. The counter is a resilient counter. The resilient counter is mounted at the bottom of the lightning protector main body 1 by a fixed outer ring, and a spring is provided inside the ball storage device 6.

The lightning protector main body 1 is made of hydrophobic material, and an outer surface of the lightning protector main body 1 is provided with an umbrella skirt. The arc-striking electrode 2 is a graphite electrode; the arc-guiding ball is a copper ball; the arc-guiding electrode is a copper electrode; and the arc-extinguishing tube is a thin ceramic tube.

Embodiment 3

An arc compression-based arc-extinguishing lightning-protection gap device includes a lightning protector main body 1 and an arc-striking electrode 2. The arc-striking electrode 2 is fixedly mounted at one end of the main body 1, the other end of the main body 1 is fixedly mounted, by means of a link fitting 7, to a crossarm or one end of an insulator string; the main body 1 is provided with an arc-extinguishing path 4 consisting of several arc-extinguishing channels in a repeated Z-shaped arrangement, and each arc-extinguishing channel is provided with two arc-extinguishing tubes between which a arc-guiding ball is provided; the arc-extinguishing tube at an inlet of a first arc-extinguishing channel of the arc-extinguishing path 4 is connected to the arc-striking electrode 2 via an arc-guiding rod, and the arc-extinguishing tube at an outlet of a last arc-extinguishing channel is connected to the link fitting 7. A three-way tube 3 is provided at a joint of two adjacent arc-extinguishing channels; two ends of the three-way tube 3 are each provided with one arc-guiding electrode; and the arc-guiding electrode has one end extending into the three-way tube 3 and the other end connected to a nearby arc-extinguishing tube via a wire. The arc-guiding electrode in the three-way tube 3 has a cylindrical shape, and the arc-guiding electrode adjacent to the port of the arc-extinguishing tube has an annular shape. A pair of the arc-guiding electrodes in the three-way tube 3 is spaced apart air gap of about 3 mm, and the length of the air gap is exactly the diameter of the radial tube of the three-way tube 3.

A counter is provided at the outlet of the last arc-extinguishing channel. The counter includes a ball storage device 6 and counting balls 5 placed within the ball storage device 6; an outlet of the ball storage device 6 corresponds to the outlet of the last arc-extinguishing channel. A baffle is provided at the outlet of the ball storage device 6. The counting balls 5 are marked with numbers. The counter is a vertical counter.

A nut I is provided within the bottom of the lightning protector main body 1; the outer surface of the link fitting 7 is provided with external thread, which is in threaded connection with the nut I within the lightning protector main body 1 by pressing tightly an external nut against a fixed plate. The lightning protector main body 1 is made of hydrophobic material, and an outer surface of the lightning protector main body 1 is provided with an umbrella skirt. The arc-striking electrode 2 is a graphite electrode; the arc-guiding ball is a graphite ball; the arc-guiding electrode is a copper electrode; and the arc-extinguishing tube is a thin ceramic tube.

What is claimed is:

1. An arc compression-based arc-extinguishing lightning-protection gap device, comprising a lightning protector main body and an arc-striking electrode, wherein the arc-striking electrode is fixedly mounted at one end of the main body, the other end of the main body is fixedly mounted, by means of a link fitting, to a crossarm or one end of an insulator string; the main body is provided with an arc-extinguishing path consisting of several arc-extinguishing channels in a repeated Z-shaped arrangement, and each arc-extinguishing channel is provided with two arc-extinguishing tubes between which a arc-guiding ball is provided; the arc-extinguishing tube at an inlet of a first arc-extinguishing channel of the arc-extinguishing path is connected to the arc-striking electrode via an arc-guiding rod, and the arc-extinguishing tube at an outlet of a last arc-extinguishing channel is connected to the link fitting; wherein a three-way tube is provided at a joint of two adjacent arc-extinguishing channels; two ends of the three-way tube are each provided with one arc-guiding electrode; and the arc-guiding electrode has one end extending into the three-way tube and the other end connected to a nearby arc-extinguishing tube via direct contact or a wire.

2. The arc compression-based arc-extinguishing lightning-protection gap device of claim 1, wherein the arc-guiding electrode in the three-way tube has a cylindrical shape, and the arc-guiding electrode adjacent to a port of the arc-extinguishing tube has an annular shape.

3. The arc compression-based arc-extinguishing lightning-protection gap device of claim 2, wherein a pair of the arc-guiding electrodes in the three-way tube is spaced apart by an air gap of 2-3 mm, and a length of the air gap is exactly a diameter of radial tube of the three-way tube.

4. The arc compression-based arc-extinguishing lightning-protection gap device of claim 1, wherein a counter is provided at the outlet of the last arc-extinguishing channel; the counter includes a ball storage device and counting balls placed within the ball storage device; an outlet of the ball storage device corresponds to the outlet of the last arc-extinguishing channel.

5. The arc compression-based arc-extinguishing lightning-protection gap device of claim 4, wherein a baffle is provided at the outlet of the ball storage device; the counting balls are marked with different colors or numbers; and the counter is a spiral or vertical or resilient counter.

6. The arc compression-based arc-extinguishing lightning-protection gap device of claim 5, wherein the ball storage device of the spiral counter is spirally mounted on the lightning protector main body.

7. The arc compression-based arc-extinguishing lightning-protection gap device of claim 5, wherein the resilient counter is mounted at the bottom of the lightning protector main body by a fixed outer ring, and a spring is provided inside the ball storage device.

8. The arc compression-based arc-extinguishing lightning-protection gap device of claim 1, wherein a nut I is provided within the bottom of the lightning protector main body; an outer surface of the link fitting is provided with external thread, which is in threaded connection with the nut I within the lightning-protector main body by pressing tightly an external nut against a fixed plate.

9. The arc compression-based arc-extinguishing lightning-protection gap device of claim 1, wherein the lightning protector main body is made of hydrophobic material, and an outer surface of the lightning protector main body is provided with an umbrella skirt.

10. The arc compression-based arc-extinguishing lightning-protection gap device of claim 1, wherein the arc-striking electrode is a graphite electrode; the arc-guiding electrode is a copper electrode; and the arc-extinguishing tube is a thin ceramic tube.

* * * * *